No. 620,275. Patented Feb. 28, 1899.
H. C. CADY.
CAR FENDER.
(Application filed Oct. 13, 1897.)
(No Model.)
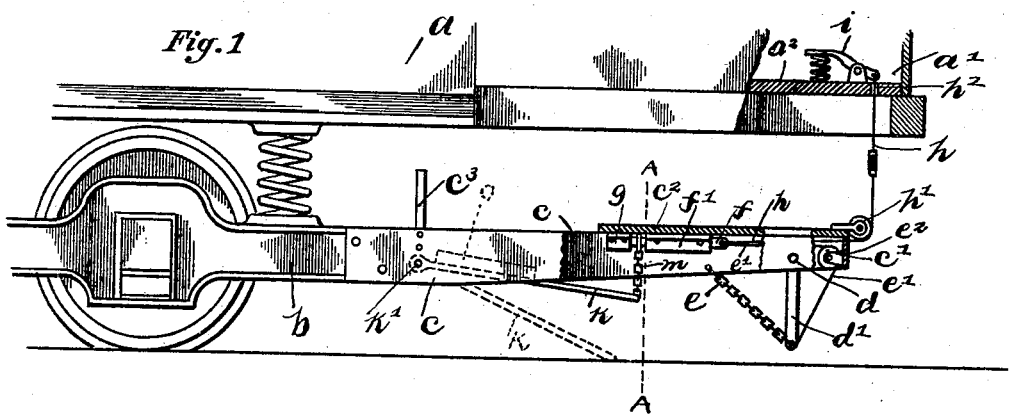
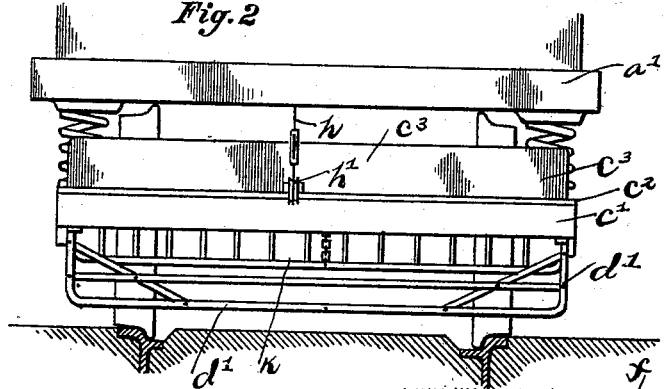
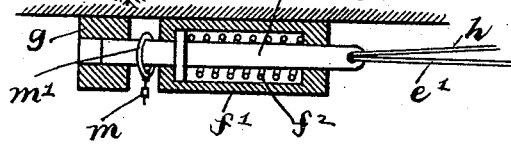
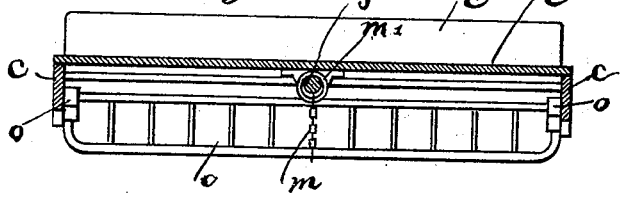
WITNESSES:
INVENTOR
Hutchins C. Cady
BY
C. C. Shepherd
ATTORNEY
THE NORRIS PETERS CO., PHOTO-LITHO., WASHINGTON, D. C.

UNITED STATES PATENT OFFICE.

HUTCHINS C. CADY, OF COLUMBUS, OHIO.

CAR-FENDER.

SPECIFICATION forming part of Letters Patent No. 620,275, dated February 28, 1899.

Application filed October 13, 1897. Serial No. 655,012. (No model.)

*To all whom it may concern:*

Be it known that I, HUTCHINS C. CADY, a citizen of the United States, residing at Columbus, in the county of Franklin and State of Ohio, have invented a certain new and useful Improvement in Car-Fenders, of which the following is a specification.

My invention relates to the improvement of fenders for street and other cars, and has particular relation to the construction of fenders adapted for use on electric and cable cars.

The objects of my invention are to provide an ordinary car with a simple, reliable, and effective mechanism by means of which the body of a person struck by a moving car will be taken up in comparative safety and prevented from contact with the wheels or other mechanism; to so construct and arrange my improved fender and trip therefor as to support the same entirely from the trucks or extensions thereof, and thereby retain the depending parts at desirable distances from the ground, regardless of the rocking or other movement of the car-body; to so construct my improved fender as to admit of its operation automatically or by the action of the motorman, and to produce other improvements, which will be more fully set forth hereinafter. These objects I accomplish in the manner illustrated in the accompanying drawings, in which—

Figure 1 is a side elevation of the lower portion of one end of a car and truck, showing my improved fender and trip connected therewith and for the sake of clearness showing a portion of said car and fender-supporting frame broken away. Fig. 2 is a front view of the same. Fig. 3 is a detail view in section of the fender-supporting bolt, and Fig. 4 is a sectional view on line A A of Fig. 1.

Similar letters refer to similar parts throughout the several views.

$a$ represents a portion of a street-car body, which may be of any well-known form, said car being provided with the usual end platforms $a'$.

$b$ represents the parallel side truck-frames of the car, which in carrying out my invention I provide with forwardly-extending parallel arms or frame extensions $c$. These truck extension-arms $c$, which extend beneath the car-platform, are connected at their forward end by a transverse plate or bar $c'$ and have their upper sides connected by a transverse plate or bar $c^2$. Between the rear portions of the truck extension-arms $c$ I provide a vertical and transverse back frame-piece $c^3$.

Suitably fulcrumed at $d$ between the forward portions of the truck extension-arms $c$ is the upper side of a depending trip-frame $d'$, the lower side of the latter extending to within the desired distance of the ground. At its ends this trip-frame $d'$ has its lower portion connected with the extension-arms $c$ at points in rear of the fulcrum-points $d$ by means of short chains $e$, the latter being of such length as to limit the outward-swinging movement of the trip-arms beyond the vertical position shown in Fig. 1 of the drawings. With the lower portion of the trip-frame $d'$ is connected a suitable cord $e'$, which, extending upward on the outer side of said trip-frame, passes over a pulley $e^2$, which is journaled on the rear side of the front frame-bar $c'$. From this pulley said cord $e'$ extends rearwardly beneath the top plate $c^2$ and is connected with the outer end of a spring-actuated bolt $f$, the latter working in a suitable spring-bolt casing $f'$, which is secured to the under side of said plate $c^2$. The forward end of the bolt $f$ is adapted, as shown, to enter a socket catch-piece $g$, which is also secured to the under side of the plate $c^2$ at a short distance from the inner end of said casing $f'$, said bolt being normally held in engagement with said socket-piece through the medium of its spring $f^2$. With the forward end of the bolt $f$ is also connected a cord $h$, the latter extending forwardly or outwardly from said bolt and passing under a pulley $h'$, supported from the forward end of the truck extension-frame. From this pulley $h'$ the cord $h$ extends upward through a suitable opening $h^2$ in the floor $a^2$ of the car-platform. The upper end of the cord $h$ is suitably connected with one end of a spring-actuated fulcrumed foot-lever $i$, which is arranged immediately above the car-floor.

$k$ represents a fender or catch-frame, which is preferably formed of connected metallic bars or other suitable open-work, this fender being fulcrumed at its rear end portion, as indicated at $k'$, between the rear end portions of the arms $c$ and adjacent to the lower side of the back frame-piece $c^3$. This fender or frame $k$ has connected with its forward or outer end a chain $m$, the outer end of which terminates in a ring $m'$, the latter being normally engaged by that portion of the bolt $f$ which is between the casing $f'$ and catch-socket $g$. Through the medium of the chain $m$ the fender $k$ is retained in a position slightly inclined from a horizontal line and is prevented from further upward movement by contact with inclined stops or shoulder-pieces $o$, which are secured to the inner sides of the arms $c$.

The manner of utilizing my device is substantially as follows: The contact of the trip-frame $d'$ with the body of a person on the track results in the rearward-swinging movement of said trip-frame and in allowing said frame to pass over the body. This rearward-swinging movement of the trip-frame results, as will readily be seen, in such pull upon the cord $e'$ as to result in the withdrawal of the bolt $f$ from connection with the ring $m'$ of the chain $m$, thus allowing the fender-frame $k$ to drop until its forward edge rests and travels upon the track-rails, as indicated by dotted lines in Fig. 1. In this position the fender is adapted to take up the body of the person struck by the trip, and said body is thus prevented from any possible contact with the wheels or other framework of the car. In case the motorman or car-operator should have time to do so he may cause the dropping action of the fender $k$ by a depression of the spring-supported end of the lever $i$, resulting in a lifting of the cord $h$ and a withdrawal of the bolt $f$. It is obvious that the transverse back plate $c^3$ will serve to prevent any tendency of the body passing over the fender. It will also be observed that in the construction of my device the tripping mechanism, as well as the fender and their supports, are connected with the truck-frame or extensions thereof, and are in no way connected with or supported from the body of the car. In this manner I am enabled to support the depending parts at stated distances from the ground and prevent any tendency toward contact between said parts and ground through the rocking or other movement of the car.

It will be observed that the parts of my device are simple and may be produced at a reasonable cost of manufacture, said device being so constructed as to provide for its attachment to any of the ordinary car-trucks.

Having now fully described my invention, what I claim, and desire to secure by Letters Patent, is—

1. In a fender for cars the combination with a car and its trucks, and an extended framework for said trucks consisting of parallel side bars $c$, a top plate $c^2$ and end plate $c'$, of a spring-actuated bolt secured beneath said top plate, a fulcrumed trip-frame supported from the forward end portion of said truck-frame extension, a cord connecting the latter with said spring-actuated bolt, a fender-frame fulcrumed between said frame-arms $c$, a chain connected with said fender-frame and detachably connected with said bolt and stops $o$ rigidly secured to the inner sides of said arms $c$, substantially as and for the purpose specified.

2. In a fender for cars the combination with the car body and trucks and a frame extension of said truck-frame, of a spring-actuated bolt secured to said frame extension, a trip-frame fulcrumed to said frame extension, a fender fulcrumed to said frame extension and detachably connected with said bolt, a cord connecting said bolt and trip-frame, a spring-actuated foot-lever fulcrumed on the car-platform and a cord connecting said foot-lever with said bolt, substantially as and for the purpose specified.

HUTCHINS C. CADY.

In presence of—
C. C. SHEPHERD,
P. S. KARSHNER.